US012771224B2

(12) United States Patent
Hanini et al.

(10) Patent No.: US 12,771,224 B2
(45) Date of Patent: Oct. 20, 2026

(54) MAGNETIC HYSTERESIS BRAKE WITH REDUCED ELASTIC RETURN

(71) Applicant: SAFRAN ELECTRONICS & DEFENSE, Paris (FR)

(72) Inventors: Hugo Hanini, Moissy-Cramayel (FR); Blaise Lapôtre, Moissy-Cramayel (FR); Julien Argenton, Moissy-Cramayel (FR); Rémi-Louis Lawniczak, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 18/991,078

(22) Filed: Dec. 20, 2024

(65) Prior Publication Data

US 2025/0211081 A1 Jun. 26, 2025

(30) Foreign Application Priority Data

Dec. 21, 2023 (FR) .................................. FR2314770

(51) Int. Cl.

*H02K 49/04* (2006.01)
*G05G 5/03* (2008.04)

(52) U.S. Cl.

CPC ............. *H02K 49/043* (2013.01); *G05G 5/03* (2013.01)

(58) Field of Classification Search

None

See application file for complete search history.

(56) References Cited

U.S. PATENT DOCUMENTS

| | | | | |
|---|---|---|---|---|
| 5,714,820 | A | 2/1998 | Mitsuhashi et al. | |
| 2008/0030091 | A1 * | 2/2008 | Unseld ................ | H02K 49/065 310/106 |

FOREIGN PATENT DOCUMENTS

| | | | | |
|---|---|---|---|---|
| DE | 3732766 A1 | 4/1988 | | |
| DE | 102012216548 A1 * | 6/2013 | .............. | G05G 5/03 |
| FR | 3133499 A1 | 9/2023 | | |

* cited by examiner

*Primary Examiner* — Vicky A Johnson

(74) *Attorney, Agent, or Firm* — MUNCY, GEISSLER, OLDS & LOWE, P.C.

(57) ABSTRACT

A magnetic hysteresis brake (10), comprising at least a first member (11.1) carrying first magnets (17.1) and a second member (12) made of magnetic material, each first magnet having a first surface (15.1) facing a first surface (14) of the second member (12) in order to generate a first magnetic flux towards the second member (12) through said surfaces, characterised in that the first magnets (17.1) are separated from one another by magnetic elements (18.1) which are made of a magnetic flux-conducting material and which have a first surface facing the first surface (14) of the second member (12) and close to the first surface (15.1) of the adjacent first magnets (17.1) in order to let pass a second magnetic flux the direction of which is opposite to the first flux of the first adjacent magnets, the first surface of the magnetic elements being of smaller size than the first surface (15.1) of the first magnets.

The invention also relates to a control instrument and to a vehicle comprising such a brake.

11 Claims, 6 Drawing Sheets

MAGNETIC HYSTERESIS BRAKE WITH REDUCED ELASTIC RETURN

The present invention relates to a magnetic hysteresis brake which is usable, for example, in human/machine interfaces, to generate a force which is resistant to the movement of an object, such as a control instrument handled by a user.

PRIOR ART OF THE INVENTION

The resistant force in question is the result of a hysteretic loss imitating a friction exerted on a part connected to the object to be braked.

A magnetic hysteresis brake comprises two facing elements and which are movable relative to each other, namely a rotor and a stator: one of the elements, for example, the stator has magnetic poles facing the rotor and the rotor is made of a material, which has magnetic properties, such as:

- when the material is subjected to an excitation magnetic field, a magnetic field is induced in the material, and
- when the excitation field varies, the corresponding induced field describes a hysteresis cycle, i.e. that when the excitation field returns to its initial value (zero), the induced field remains (it is said that the material preserves a remanent induction).

Thus, the magnetic poles of the stator impose a magnetic field in the rotor. When the rotor is in motion, the magnetic field remains unchanged relative to the stator and therefore, variable in the rotor. This variation creates hysteretic losses proportional to the motion of the rotor. In other words, it results in a constant force that opposes the motion of the rotor.

Such magnetic hysteresis brakes are used, for example, in control instruments. The rotor is thus connected to a handle of the control instrument, this handle being moved by a user, for example, to control a device such as a motor. The induced magnetic field produces a resistance to the movement of the rotor and therefore, a resistance to the movement of the handle handled by the user. This resistance allows the user to best determine the motion that they impress on the handle of the control instrument.

Document FR-A-2998347 describes a magnetic brake in which the poles are formed by electromagnetic windings.

The magnetic poles can also be formed by permanent magnets, which allows to have a simpler structure and without any need of power supply.

However, the magnetic hysteresis brakes have a magnetic elastic return that causes the rotor to move away from the movement imparted by the user on the handle once it is released. It is necessary for this magnetic elastic return to have the smallest possible amplitude to allow the handle to remain in the position in which the handle has been released. Indeed, in the case where the magnetic elastic return amplitude is high, the handle moves back after having been released and the motor thrust setpoint is erroneous. Furthermore, the magnetic elastic return is defined as a physical phenomenon due to the hysteresis cycle of the magnetic material used and the number of magnetic poles. Increasing the number of magnetic poles would allow to reduce the magnetic elastic return. However, increasing the number of magnetic poles would proportionally increase the bulk and mass of the magnetic hysteresis brake.

AIM OF THE INVENTION

A particular aim of the invention is to provide a magnetic hysteresis brake that overcomes the above-mentioned drawbacks, at least in part.

SUMMARY OF THE INVENTION

To this end, according to the invention, a magnetic hysteresis brake is provided, comprising at least a first member carrying first magnets and a second member made of magnetic material, each first magnet having a first surface facing a first surface of the second member, for generating a first magnetic flux towards the second member through said surfaces, characterised in that the first magnets are separated from one another by magnetic elements which are made of a magnetic flux-conducting material and which have a first surface facing the first surface of the second member and adjacent to the first surface of the adjacent first magnets to let pass a second magnetic flux the direction of which is opposite to the first flux of the first adjacent magnets, the first surface of the magnetic elements being of smaller size than the first surface of the first magnets.

Thus, these magnetic elements are provided with a polarity opposite to that of the first magnets and therefore, allow to increase the number of poles in a smaller space . . . The magnetic elements can be teeth made of a non-magnetic material or permanent magnets.

In addition, a brake is proposed in which the first member comprises a framework having teeth forming the magnetic elements, each first magnet being mounted between two of the teeth, which are adjacent to each other.

In addition, a brake is proposed, in which the first member and the second member are mounted to rotate relative to each other about an axis of rotation.

In addition, a brake is proposed, in which the first surface of each first magnet and the first surface of the second member are cylindrical with a circular cross-section; the first magnets of the first member being arranged in a cylinder and the first magnetic flux being radial.

In addition, a brake is proposed, in which the second member is tubular with a circular cross-section and the brake comprises a second first member which is disposed in the second member and which has a first surface facing a second surface of the second member, said second surface of the second member being opposite to the first surface of the second member.

In addition, a brake is proposed, in which the first surface of the first magnets and the first surface of the second member are planar; the first magnets of the first member being arranged in a circle and the first magnetic flux being axial.

In addition, a brake is proposed, comprising a plurality of first members and a plurality of second members.

The invention also relates to a control instrument comprising a frame, a handle mounted movably on the frame, and a brake, one of the first member and the second member being fixedly mounted relative to the frame and the other of the first member and the second member being connected to the handle.

According to a particular embodiment, the handle is mounted on the frame to pivot.

Advantageously, the control instrument comprises a gearbox having a first shaft connected to said other of the first member and the second member and a second shaft connected to the handle.

In addition, a vehicle is provided having a control instrument.

In addition, the invention relates to a vehicle equipped with such a control instrument.

Other features and advantages of the invention will become apparent on reading the following description of particular and non-limiting embodiments of the invention.

BRIEF DESCRIPTION OF THE DRAWINGS

Reference will be made to the accompanying drawings, in which.

DETAILED DESCRIPTION OF THE INVENTION

Figure 1:
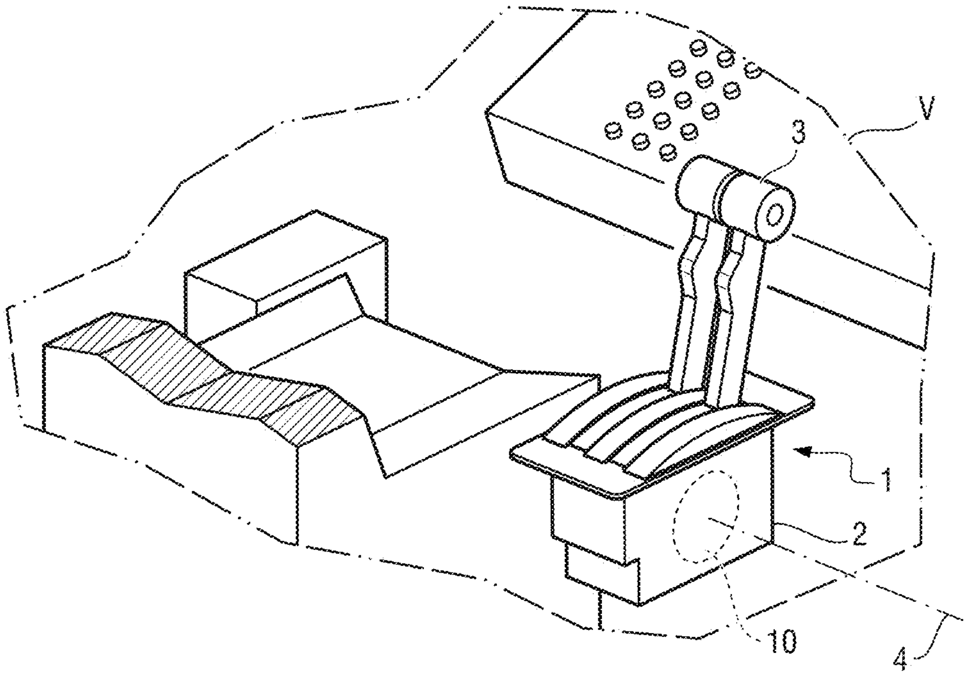
FIG. 1 is a partial schematic view of a vehicle cockpit, provided with a control instrument, according to the invention.

With reference to FIGS. 1 to 6, the invention is, in this case, described in application to a control instrument, generally referenced as 1, equipping the cockpit of a vehicle V such as an aerial, land or naval vehicle. The control instrument 1 is, in this case, arranged to control the motor of said vehicle (the control instrument 1 is, in this case, what is commonly called the throttle).

The control instrument 1 comprises a frame 2, which is fixed to the structure of the vehicle V, in the cockpit, within the pilot's reach.

A handle 3 is mounted on the frame 2 to pivot about an axis of rotation 4, in this case, horizontal.

The control instrument 1 further comprises, a brake 10 comprising two stators 11.1, 11.2 rotatably connected to the frame 2 and a rotor 12 rotatably connected to the handle 3. The first stator 11.1 may be referred to as the "first member". The second stator 11.2 may be referred to as the "second first member". Furthermore, the rotor 12 may be referred to as the "second member".

The brake 10 is a magnetic hysteresis brake.

Figure 2:
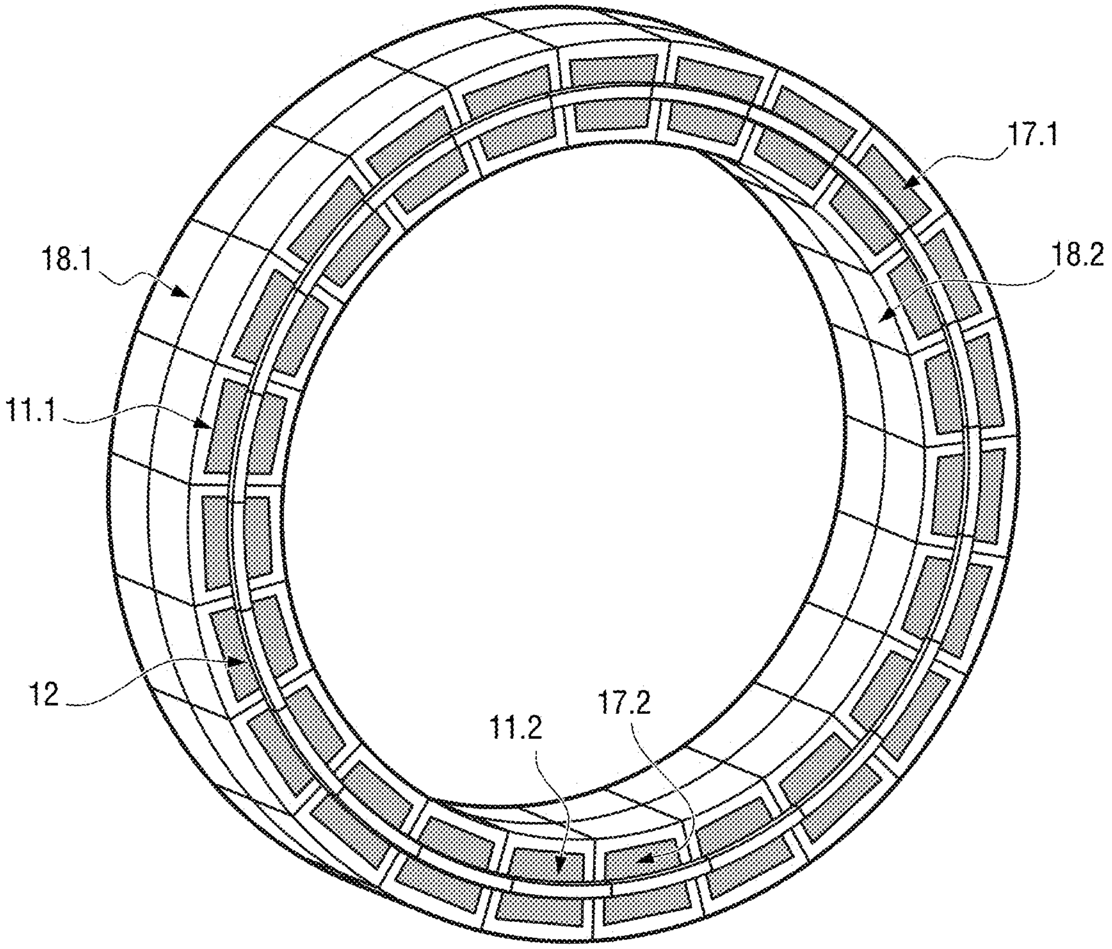
FIG. 2 is a perspective view of a brake equipping the control instrument, according to a first embodiment.
Figure 3:
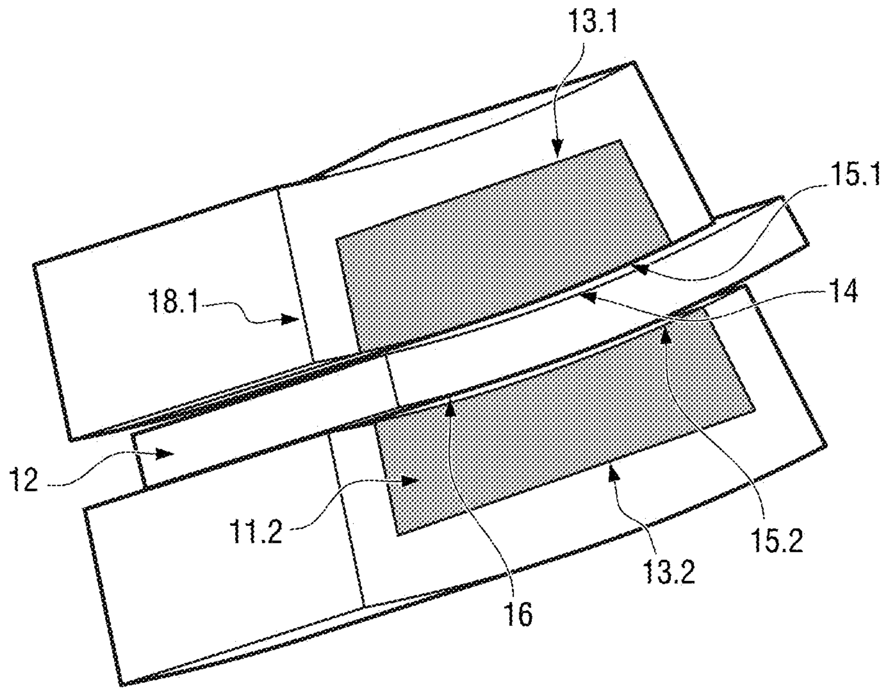
FIG. 3 is a perspective view of a portion of the brake according to the first embodiment.

According to the first embodiment shown in FIGS. 2 and 3, the rotor 12 in this case is a bell having a cylindrical outer surface 14 and a cylindrical inner surface 16 that is coaxial with the outer surface 14 and defines an inner housing of the rotor 12. The outer surface 14 and the inner surface 16 form major surfaces of the rotor 12.

The rotor 12 is made of a magnetic material and more particularly, in this case, a semi-remanent material. The material chosen is called "semi-remanent" as its major hysteresis cycle is close to that of a magnet. The material is, for example, that produced under the trademark MAGNETOFLEX (and more specifically, MAGNETOFLEX 35 U) or CROVAC, by the manufacturer VACUUMSCHMELZE.

The rotor 12 further comprises a tubular hub which is centred on the axis of rotation 4 and which connects the rotor 12 to the handle 3.

The stator 11.1 is an outer stator extending around the rotor 12 and the stator 11.2 is an inner stator extending into the housing of the rotor 12.

The stator 11.1 comprises a cylindrical framework, made of a magnetic flux-conducting material, centred on the axis of rotation 4, and a set of permanent magnets 17.1 which are fixed to the inner periphery of the cylindrical framework so as to have a free surface forming a substantially cylindrical main surface 15.1 of said stator 11.1 surrounding the outer surface 14 of the rotor 12. The framework comprises magnetic elements 18.1 which separate the magnets 17.1 from one another and which have a free surface close to the main surface 15.1 of said stator 11.1. In this case, the magnetic elements are teeth 18.1 integral with the framework.

The teeth 18.1 are shaped to define therebetween housings for said magnets 17.1 and have widened free ends to project slightly into the housings over opposite side portions of the magnets 17.1. In other words, the magnets 17.1 are held by the teeth 18.1, said teeth 18.1 partly covering the magnets 17.1 in their housings. The free surface of the teeth 18.1 here is flush with the free surface of the magnets 17.1 and therefore, coincides with the main surface 15.1 of the stator 11.1. The teeth 18.1 occupy a smaller portion (or area) in the main surface 15.1 of the stator 11.1 than that of the magnets 17.1. Therefore, the surface (or area) occupied by the magnets 17.1 and therefore, the performance of the brake 10, is optimised to the maximum, the teeth 18.1 being mainly arranged to separate the magnets 17.1 from one another. The magnets 17.1 are positioned so that their magnetisation vector extends in a radial direction of the stator 11.1 to produce a radial or axial magnetic flux in the case illustrated in FIGS. 4 to 6. Furthermore, the magnets 17.1 all have the same pole oriented towards the rotor 12. Each of the teeth 18.1 let pass a second flux the direction of which is opposite to the first flux of the two magnets 17.1 that surround it to allow the magnetic field produced by the two magnets 17.1 to be looped. This architecture allows optimal magnetic flux loop-back.

The stator 11.1 comprises a cylindrical outer surface 13.1 coaxial with the main surface 15.1 constituting the inner surface of the stator 11.1. The diameter of the main surface 15.1 of the stator 11.1 is slightly greater than the diameter of the outer surface 14 of the rotor 12.

The stator 11.2 has a structure similar to the stator 11.1 and is coaxial with the latter and the rotor 12. The stator 11.2 is however arranged in the inner housing of the rotor 12 and comprises a framework carrying magnets 17.2 on its outer periphery. The magnets 17.2 have a free surface defining a main surface 15.2 (which is the outer surface of the stator 11.2 and not the inner surface as in the stator 11.1) and having magnetic elements 18.2 separating the magnets 17.2 from one another. In this case, the magnetic elements are teeth 18.2.

The teeth 18.2 are shaped to define therebetween housings for the magnets 17.2 and have widened free ends to project slightly into the housings over opposite side portions of the magnets 17.2. In other words, the magnets 17.2 are held by the teeth 18.2, said teeth 18.2 partly covering the magnets 17.2 in their housings.

As previously, the teeth 18.2 have a free surface close to the main surface 15.2 of said stator 11.2. The free surface of the teeth 18.2, in this case, is flush with the free surface of the magnets 17.2 and therefore, coincides with the main surface 15.2 of the stator 11.2. The teeth 18.2 occupy a smaller portion (or area) in the main surface 15.2 of the stator 11.2 than that of the magnets 17.2. Therefore, the surface (or area) occupied by the magnets 17.2 and therefore, the performance of the brake 10, is optimised to the maximum, the teeth 18.2 being mainly arranged to separate the magnets 17.2 from one another. The magnets 17.2 are positioned so that their magnetisation vector extends along a radial direction of the stator 11.2 to produce a radial magnetic flux. Furthermore, the magnets 17.2 all have the same pole oriented towards the rotor 12. This architecture allows optimal loop-back of the magnetic flux.

The stator 11.2 comprises a cylindrical inner surface 13.2 coaxial with the main surface 15.2 constituting the outer surface of the stator 11.2.

It can be understood that when the pilot moves the handle 3, the handle 3 moves the rotor 12 in rotation. Under the effect of the rotation of the rotor 12 relative to the stators 11.1 and 11.2, the bell saturates locally opposite the poles, which will generate dry friction.

It should be noted that the teeth 18.1, 18.2 allow to increase the number of poles, to channel the magnetic flux and to reduce the elastic return. More particularly, the number of poles allows the bell to align more, when it is remanent with the poles.

Figure 4:
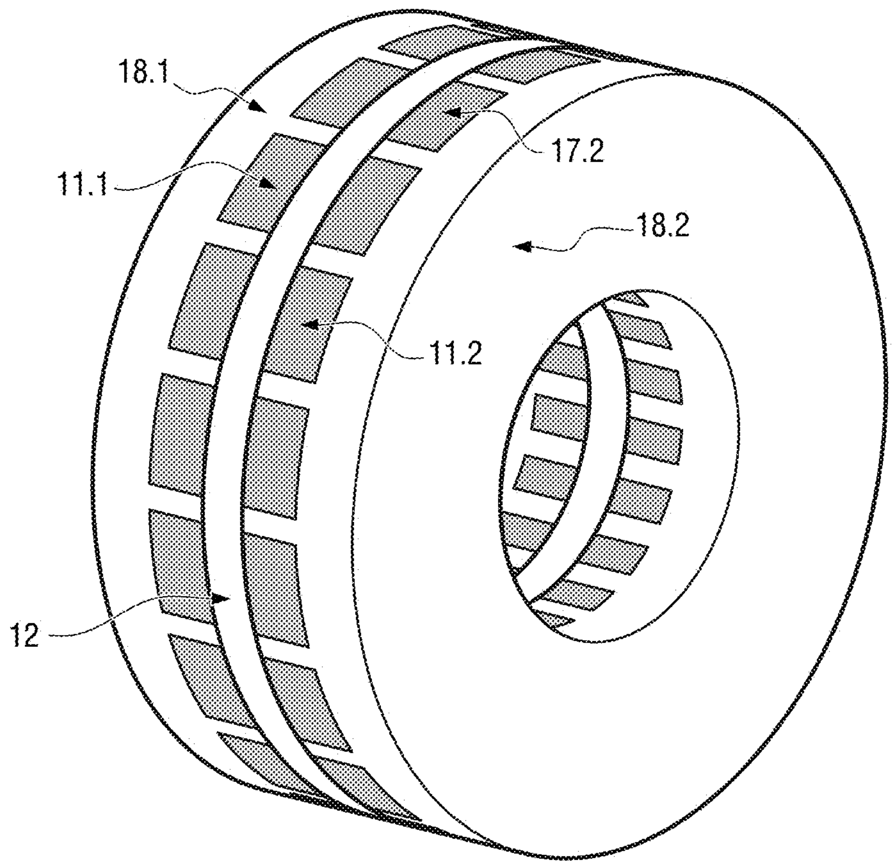
FIG. 4 is a perspective view of a brake equipping the control instrument, according to a second embodiment.
Figure 5:
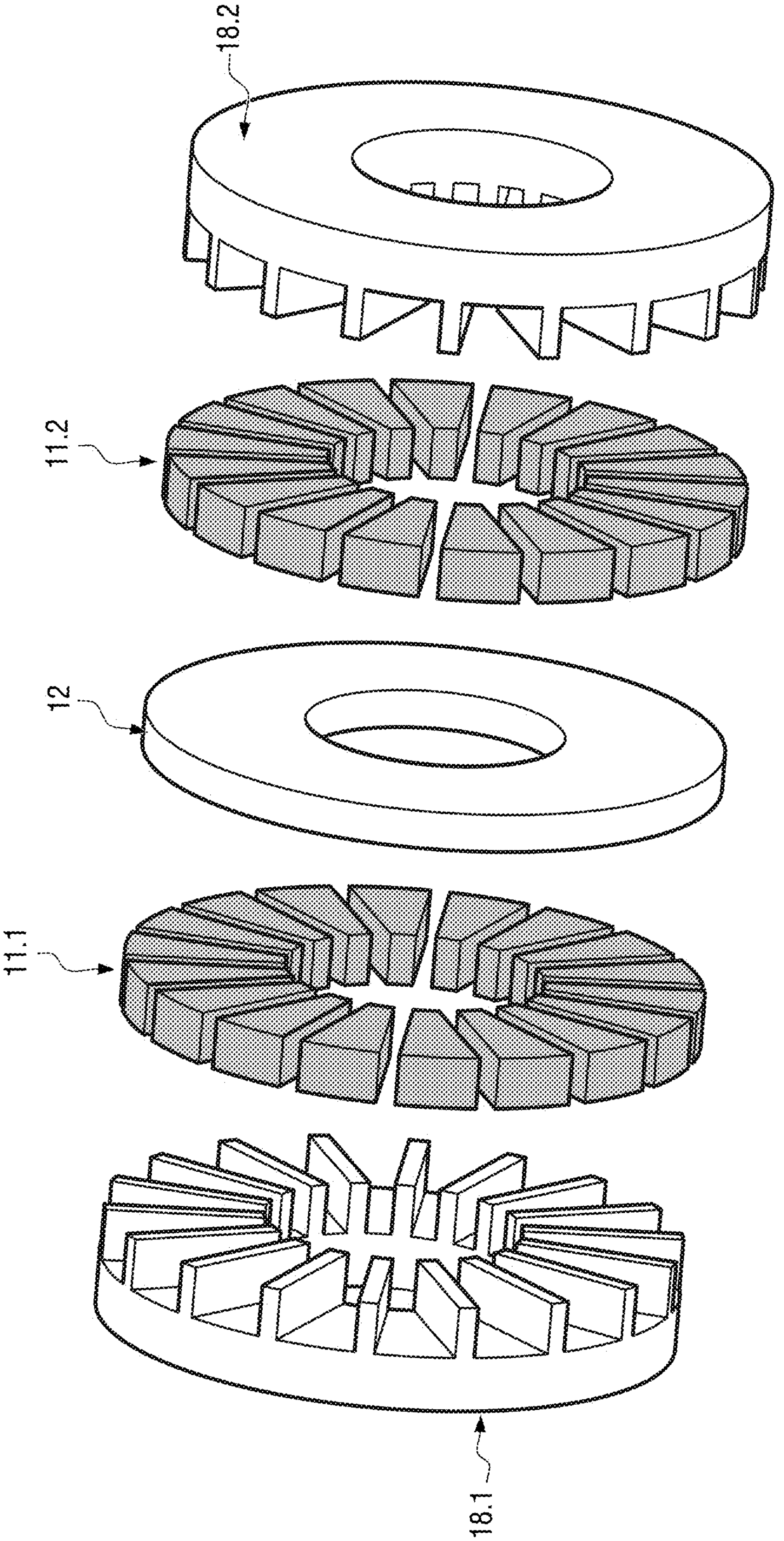
FIG. 5 is an exploded, perspective of the brake according to the second embodiment.
Figure 6:
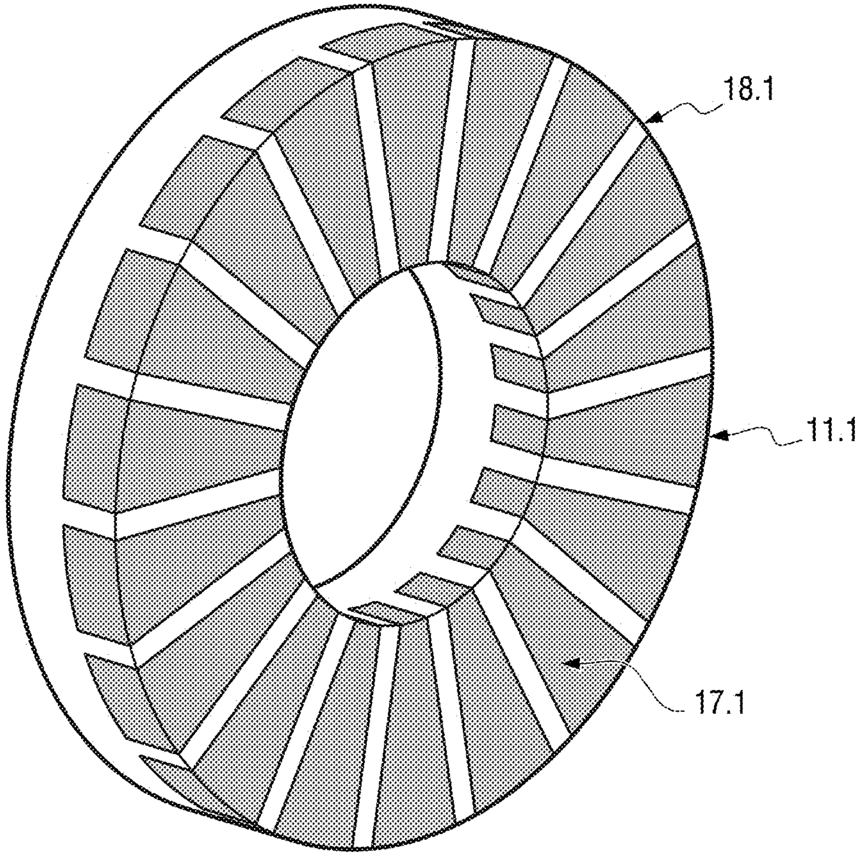
FIG. 6 is another perspective view of the brake according to the second embodiment.

In the second embodiment of FIGS. 4 to 6, the stators 11.1, 11.2 and the rotor 12 are not arranged in the same way. Indeed, the stators 11.1, 11.2 and the rotor 12 are disk-shaped and the stators 11.1, 11.2 have plane main surfaces facing opposite plane main surfaces of the rotor 12. As a result, the rotor 12 has a central position between the stators 11.1, 11.2.

As previously, the main surfaces 15.1, 15.2 of the stators 11.1, 11.2 are formed by the free surfaces of the magnets 17.1, 17.2 which are carried by a framework comprising magnetic elements 18.1, 18.2 separating the magnets 17.1, 17.2 from one another. In this embodiment, as in the previous one, the magnetic elements are teeth 18.1, 18.2 of the framework.

Teeth 18.1, 18.2 are shaped to carry said magnets 17.1, 17.2. In other words, the magnets 17.1, 17.2 are held by the teeth 18.1, 18.2, said teeth 18.1, 18.2 partially covering the magnets 17.1, 17.2 in their housings. The teeth 18.1, 18.2 have a free surface flush with the main surfaces 15.1, 15.2 of the stators 11.1, 11.2. The teeth 18.1, 18.2 occupy in the main surfaces 15.1, 15.2 of the stators 11.1, 11.2, a smaller portion than that of the magnets 17.1, 17.2. Therefore, the surface occupied by the magnets 17.1, 17.2 and therefore, the performance of the brake 10, is optimised to the maximum, the teeth 18.1, 18.2 being mainly arranged to separate the magnets 17.1, 17.2 from one another. The magnets 17.1, 17.2 of the stators 11.1 and 11.2 are arranged in a circle and have a magnetisation vector parallel to the axis of rotation 4 and the direction of which is oriented towards the rotor 12 to produce an axial magnetic flux.

The aforementioned friction torque is adjustable by offsetting one stator 11 relative to the other. Particularly, and with reference to FIGS. 2 and 3, each of the teeth 18.1 carried by the stator 11.1 faces one of the teeth 18.2 carried by the stator 11.2. It will be noted that in order to adjust the resistant force, it suffices to offset one stator relative to the other and, for example, to make each tooth 18.1 of the stator 11.1 coincide with one of the magnets 17.2 of the stator 11.2.

Alternatively, a gearbox may be associated with the brake in order to further reduce the amplitude of the effect of the magnetic elastic return. In such an embodiment, the gearbox comprises a first shaft connected to the rotor and a second shaft connected to the handle. The transmission ratio x of the gearbox, from the handle 3 to the rotor 12, is greater than 1 so that a return of the rotor 12 over an angular amplitude θ will result in a movement of the handle 3 of a lesser amplitude equal to θ/x.

Naturally, the invention is not limited to the embodiments described, but comprises any variant entering into the scope of the invention such as defined by the claims.

Particularly, the brake can have a different structure from that described above.

The handle of the control instrument can, for example, be a button, a steering wheel, a lever, or other. The invention is also applicable to rudder controls, and more generally, for any device needing to implement a dry friction.

The handle can be mounted on the frame to slide along a linear axis.

The stator can constitute the inner element and the rotor can constitute the outer element, or vice versa. The brake may comprise a stator in the form of a drum and two annular rotors, one extending in the drum and the other around the drum.

The rotor 12 and the stator 11 can be mounted relative to each other so as to be movable, not only rotatable about the axis of rotation 4, but also translatable along the axis of rotation 4 to allow adjustment of the air gap between the stator and the rotor. To this end, the hub of the rotor 12 is mounted to slide axially over a tubular shaft rotatably connected, in this case, via an inner gearing, to the handle 3 and mounted in the frame 2 to pivot about the axis of rotation 4.

Alternatively, the stator can be rotatably fixed and translatable, while the rotor is rotatably movable and translatably fixed.

The rotor can have the shape of a solid cylinder and not a hollow hub.

The rotor can carry the magnets and the stator can be made of semi-remanent or low-remanent material.

The number of magnets and therefore teeth, as well as the number of rotor(s) and/or stator(s) depend on the desired performance according to the intended application (braking torque, bulk, mass, effect of magnetic elastic return).

Another possible architecture may be the successive alternation of a stator and then a rotor, at a frequency defined based on the desired performance depending on the envisaged application.

The magnets may be fastened by means distinct from the shape of the teeth, for example, by gluing or screwing.

Alternatively, the teeth can be replaced by second magnets having a polarisation opposite to that of the first magnets: each second magnet is thus passed through by a second flux in the opposite direction to the first flux passing through the two first magnets that surround it.

Provision can be made for each of the first magnets to have poles of different sizes.

The invention claimed is:

1. A magnetic hysteresis brake, comprising:

a first member carrying first magnets; and a second member made of magnetic material, wherein each first magnet has a first surface facing a first surface of the second member in order to generate a first magnetic flux towards the second member through said surfaces, and wherein the first magnets are separated from one another by magnetic elements-which are made of a magnetic flux-conducting material and which have a first surface facing the first surface of the second member and next to the first surface of the first adjacent magnets in order to let pass a second magnetic flux the direction of which is opposite to the first flux of the first adjacent magnets, the first surface of the magnetic elements-being of smaller size than the first surface of the first magnets.

2. The brake according to claim 1, wherein the first member comprises a framework having teeth forming the magnetic elements, each first magnet being mounted between two of the teeth, which are adjacent to each other.

3. The brake according to claim 1, wherein the first member and the second member are mounted to rotate relative to each other about an axis of rotation.

4. The brake according to claim 3, wherein the first surface of each first magnet and the first surface of the second member are cylindrical with a circular cross-section; the first magnets of the first member-being arranged in a cylinder and the first magnetic flux being radial.

5. The brake according to claim 4, wherein the second member is tubular in shape with a circular cross-section and the brake comprises a second first member which is arranged in the second member and which has a first surface facing a second surface of the second member, said second surface of the second member being opposite the first surface of the second member.

6. The brake according to claim 3, wherein the first surface of the first magnets and the first surface of the second member are planar; the first magnets of the first member-being arranged in a circle and the first magnetic flux being axial.

7. The brake according to claim 1, comprising a plurality of first members and a plurality of second members.

8. A control instrument, comprising:

a frame;

a handle movably mounted on the frame; and a brake according to claim 1, one of the first member and the second member being mounted fixed relative to the frame and the other of the first member and the second member being connected to the handle.

9. The control instrument according to claim 8, wherein the handle is mounted on the frame to pivot.

10. The control instrument according to claim 9, comprising a gearbox having a first shaft connected to said other of the first member and the second member and a second shaft connected to the handle.

11. A vehicle including a control instrument according to claim 8.

* * * * *